United States Patent
Balasubramanian et al.

(10) Patent No.: US 12,083,985 B2
(45) Date of Patent: Sep. 10, 2024

(54) VEHICLE SAFETY SYSTEM IMPLEMENTING INTEGRATED ACTIVE-PASSIVE FRONT IMPACT CONTROL ALGORITHM

(71) Applicant: ZF FRIEDRICHSHAFEN AG, Friedrichshafen (DE)

(72) Inventors: Kiran Balasubramanian, Canton, MI (US); Harald Pfriender, Constance (DE); Charles A Bartlett, Commerce Township, MI (US); Andreas Fleckner, Mühlhausen-Ehingen (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 962 days.

(21) Appl. No.: 16/815,719

(22) Filed: Mar. 11, 2020

(65) Prior Publication Data
US 2021/0284091 A1    Sep. 16, 2021

(51) Int. Cl.
| | |
|---|---|
| *B60R 21/26* | (2011.01) |
| *B60R 11/04* | (2006.01) |
| *B60R 21/013* | (2006.01) |
| *B60R 22/04* | (2006.01) |
| *B60R 22/36* | (2006.01) |
| *B60R 22/48* | (2006.01) |
| *B60W 30/08* | (2012.01) |

(52) U.S. Cl.
CPC ............. *B60R 21/26* (2013.01); *B60R 11/04* (2013.01); *B60R 21/013* (2013.01); *B60R 22/04* (2013.01); *B60R 22/36* (2013.01); *B60R 22/48* (2013.01); *B60W 30/08* (2013.01)

(58) Field of Classification Search
None
See application file for complete search history.

(56) References Cited

U.S. PATENT DOCUMENTS

| | | |
|---|---|---|
| 5,935,182 A | 8/1999 | Foo et al. |
| 6,036,225 A | 3/2000 | Foo et al. |
| 7,359,781 B2 | 4/2008 | Foo et al. |
| 8,525,728 B2 | 9/2013 | Lundmark et al. |
| 9,855,915 B2 | 1/2018 | Foo et al. |
| 10,293,836 B2 | 5/2019 | Laakmann et al. |
| 2006/0095183 A1* | 5/2006 | Schuller .............. B60R 21/0132 701/45 |

(Continued)

*Primary Examiner* — Aniss Chad
*Assistant Examiner* — Mahmoud M Kazimi
(74) *Attorney, Agent, or Firm* — ROSSI, KIMMS & McDOWELL LLP (57) ABSTRACT

A vehicle safety system for helping to protect a vehicle occupant in the event of a frontal collision includes a controller, one or more crash sensors for sensing a frontal collision, and an active sensor for detecting objects in the path of the vehicle. The controller is configured to implement crash discrimination metrics that detect the occurrence of a frontal collision in response to signals received from the crash sensors. The crash discrimination metrics implement thresholds for determining whether the signals received from the crash sensors indicate the occurrence of a frontal collision. The controller is configured to implement an algorithm that uses information obtained from the active sensor to detect an object in the path of the vehicle and to select the thresholds implemented in the crash discrimination metrics in response to detecting the object.

22 Claims, 8 Drawing Sheets

(56) References Cited

U.S. PATENT DOCUMENTS

| | | | | |
|---|---|---|---|---|
| 2009/0138160 A1* | 5/2009 | Iyoda | ................ | B60R 21/0136 |
| | | | | 701/45 |
| 2012/0330512 A1* | 12/2012 | Mahlisch | ............ | B60R 21/0134 |
| | | | | 701/45 |
| 2015/0203068 A1* | 7/2015 | Foo | ........................ | B60R 21/36 |
| | | | | 701/1 |
| 2018/0023963 A1* | 1/2018 | Foltin | ................ | G01C 21/3415 |
| | | | | 701/442 |

* cited by examiner

VEHICLE SAFETY SYSTEM IMPLEMENTING INTEGRATED ACTIVE-PASSIVE FRONT IMPACT CONTROL ALGORITHM

BACKGROUND

Modern vehicles include various systems for helping to provide occupant safety. These vehicle safety systems can include passive safety systems and/or active safety systems. Generally speaking, passive safety systems are reactive systems that provide occupant protection in response to detecting the occurrence of an event for which occupant protection is desired, such as a vehicle crash. Active safety systems, on the other hand, strive to anticipate the occurrence of events for which occupant protection is desired and take active avoidance measures.

Passive safety systems include one or more passive restraints, such as airbags and seatbelt retractors, that are actuatable to help protect an occupant of a vehicle. These vehicle safety systems utilize an airbag control unit that is operatively connected to the airbags and to a variety of crash sensors, such as accelerometers and pressure sensors. In response to determining a crash scenario based on information provided by the crash sensors, the airbag control unit is operative to deploy the airbags by activating an inflator that directs inflation fluid into the airbags. When inflated, the driver and passenger airbags help protect the occupant from impacts with parts of the vehicle such as the instrument panel and/or a steering wheel of the vehicle.

Active safety systems utilize sensing devices, such as cameras, radar, lidar, and ultrasonic transducers to determine the conditions around the vehicle. In response to the sensed conditions, vehicle warning systems can provide visual, audible, tactile warnings to the driver. This can be the case, for example, with blind-spot detection, lane departure, front/rear object detection, cross traffic detection, pedestrian detection. Active safety systems can also use the sensed conditions to actively actuate vehicle controls, such as active cruise control, active braking, active steering in response to lane departure detection, etc. The sensing devices utilized in active safety systems each have certain advantages.

Cameras are very effective at object detection. When arranged to view from several angles, cameras supply the vehicle with information that can be used by artificial intelligence algorithms of vehicle safety systems to detect external objects, such as other vehicles, pedestrians, or objects, such as trees or garbage cans, along the side of the road. Cameras can measure angles precisely, which allows the vehicle safety system to recognize early on whether an approaching object will come into the vehicle's path. Utilizing both long and short range zoom in combination with varying degrees of wide and narrow fields of vision, cameras become important tools for safety features such as collision avoidance, adaptive cruise control, automated braking systems, and the lane keeping assist functions.

Radar sensors use an echo system to detect objects, which is beneficial in case of poor visibility, which can detract from the camera's effectiveness. Radar sensors emit electromagnetic waves and receive the "echo" that is reflected back from the surrounding objects. Radar sensors are especially effective in determining the distance and the speed of objects, such as vehicles and pedestrians, relative to the vehicle. Functioning regardless of weather, light or visibility conditions, radar sensors are ideal for maintaining distances, issuing collision warnings, blind-spot detection, emergency braking, etc.

Lidar sensors also apply the echo principle, using laser pulses instead of radio waves. Lidar sensors record distances and relative speeds with an accuracy on par with radar. Additionally, lidar sensors can also recognize object types and angles between objects with a much higher level of accuracy. Lidar sensors can therefore be utilized to recognize more complex traffic situations very well, even in the dark. Unlike cameras and radar sensors, the angle of view is not critical because lidar sensors can record the 360-degree environment of the vehicle. The high-resolution 3D solid state lidar sensors can even render pedestrians and smaller objects three dimensionally.

SUMMARY

The invention relates to a vehicle safety system that includes both active and passive components. In this description, "active safety" is used to refer to technology assisting in the prevention of a crash, i.e., "crash avoidance," and "passive safety" is used to refer to components of the vehicle, such as airbags, seatbelts, and the physical structure of the vehicle (e.g., crumple zones) that help to protect occupants in response to detecting the occurrence of a crash.

Passive safety systems include one or more sensors, such as accelerometers and/or pressure sensors, that are configured to sense the occurrence of a crash event. A controller is configured to receive signals from the sensors, determine or discriminate the occurrence of a collision based on the signals, and to deploy one or more actuatable restraints, such as airbags and/or seatbelt pretensioners/retractors, in response to the sensed collision.

Active safety systems, such as crash avoidance systems, are designed to prevent or reduce the severity of a vehicle crash by using radar (all-weather), laser (LIDAR), camera (employing image recognition), or a combination thereof, to detect an imminent crash. In response to detecting an imminent crash, crash avoidance systems can produce operator warnings (visual, audible, tactile) and can also actuate active safety measures, such as automatic emergency braking and/or automatic emergency steering to help avoid or mitigate the crash.

For example, a crash avoidance system can implement automatic emergency braking to detect a potential forward collision and activate the vehicle braking system to decelerate the vehicle with the purpose of avoiding or mitigating a collision. Once an impending collision is detected, the crash avoidance system provides a warning to the driver. When the collision becomes imminent, the crash avoidance system takes action automatically and autonomously, without any driver input, by applying emergency braking.

The active safety system can be a standalone system or can be a subsystem utilizing components of another system, such as a driver assist system (DAS), which utilized the camera, radar, LIDAR data to provide driver assistance functions, such as active cruise control, lane departure, blind spot monitoring, parking assist, etc. These components can even be used to provide automated driving capabilities.

According to the invention, information obtained from an active safety system is used to enhance the frontal crash discrimination performed by the passive safety system in order to improve the responsiveness of the vehicle safety system.

According to one aspect, a vehicle safety system for helping to protect a vehicle occupant in the event of a frontal collision includes a controller, one or more crash sensors for sensing a frontal collision, an active sensor for detecting objects in the path of the vehicle. The controller is configured to implement crash discrimination metrics that detect the occurrence of a frontal collision in response to signals received from the crash sensors. The crash discrimination metrics implement thresholds for determining whether the signals received from the crash sensors indicate the occurrence of a frontal collision. The controller is configured to implement an algorithm that uses information obtained from the active sensor to detect an object in the path of the vehicle and to select the thresholds implemented in the crash discrimination metrics in response to detecting the object.

According to another aspect, alone or in combination with any other aspect, the algorithm implemented by the controller can be further configured to select misuse boxes associated with the selected thresholds implemented by the crash discrimination metrics based on the information obtained from the active sensor.

According to another aspect, alone or in combination with any other aspect, the algorithm implemented by the controller can be further configured to determine an object type for the object, determine an estimated severity of an impact with the object, and select the thresholds implemented in the crash discrimination metrics further in response to at least one of the object type and the estimated severity.

According to another aspect, alone or in combination with any other aspect, the object type can be a car, truck, barrier, or pole.

According to another aspect, alone or in combination with any other aspect, the algorithm implemented by the controller can be configured to determine the estimated severity by implementing a metric that determines the estimated severity based on a relative velocity between the object and the vehicle.

According to another aspect, alone or in combination with any other aspect, the vehicle safety system can also include at least one actuatable safety device comprising an airbag with a two-stage inflator and a seatbelt pretensioner. The algorithm implemented by the controller can be configured to determine one of the following actions to take in response to the estimated severity: actuate neither the seatbelt pretensioner nor the inflator, actuate the seatbelt pretensioner only, actuate the seatbelt pretensioner and the inflator first stage; actuate the seatbelt pretensioner, inflator first stage, and the inflator second stage.

According to another aspect, alone or in combination with any other aspect, the algorithm implemented by the controller can be further configured to select misuse boxes associated with the selected thresholds implemented by the crash discrimination metrics in response to at least one of the object type and estimated severity.

According to another aspect, alone or in combination with any other aspect, the algorithm implemented by the controller can be further configured to determine the estimated severity by evaluating an estimated severity discrimination metric that compares a relative velocity of the object relative to the vehicle and displacement.

According to another aspect, alone or in combination with any other aspect, the crash sensors can include front crush zone sensors (CZS). The crash discrimination metrics can include a CZS switching discrimination metric for evaluating CZS acceleration values to determine whether a CZS switching threshold is exceeded. The crash discrimination metrics can include individual metrics associated each object type determined by the algorithm. Each individual metric can include a normal threshold and misuse box and a CZS switched threshold and misuse box. The CZS switched threshold and misuse box can be implemented by the crash discrimination metrics when the CZS switching discrimination metric determines that the CZS switching threshold is exceeded. The normal threshold and misuse box can be implemented in the absence of the CZS switching threshold being exceeded. The crash discrimination metrics can further include a normal preset threshold and misuse box, and a CZS switched preset. The CZS switched preset threshold and misuse box can be implemented by the crash discrimination metrics when the CZS switching discrimination metric determines that the CZS switching threshold is exceeded and the algorithm detects the object in the path of the vehicle. The normal preset threshold and misuse box can be implemented in the absence of the CZS switching threshold being exceeded and the algorithm detects the object in the path of the vehicle.

According to another aspect, alone or in combination with any other aspect, the algorithm implemented by the controller can be configured to detect objects in the path of the vehicle by identifying the object, determining whether a lateral position of the object with respect to the vehicle is within a predetermined threshold, evaluating a time-to-collision (TTC) discrimination metric to determine whether a relative velocity between the object and the vehicle exceeds a predetermined threshold dictating that a crash is imminent, and evaluating a longitudinal distance collision discrimination metric to determine whether the longitudinal position of the object relative to the vehicle exceeds a predetermined threshold dictating that a crash is imminent.

According to another aspect, alone or in combination with any other aspect, the algorithm implemented by the controller can be configured to detect objects in the path of the vehicle by identifying a state of the object determining whether a calculated crash probability is greater than a predetermined crash probability, and evaluating a time-to-collision (TTC) discrimination metric to determine whether the relative velocity between the object and the vehicle exceeds a predetermined threshold dictating that a crash is imminent.

According to another aspect, alone or in combination with any other aspect, the crash sensors can be components of a passive safety system further comprising at least one actuatable safety device. The passive safety system can be configured to respond to the occurrence of a vehicle collision by actuating the safety device. The active sensor can be a component of an active safety system configured to anticipate the occurrence of the vehicle collision.

According to another aspect, alone or in combination with any other aspect, the crash sensors can be at least one of crush zone sensors and airbag control unit (ACU) sensors in the form of accelerometers for measuring vehicle acceleration along a longitudinal vehicle axis.

According to another aspect, alone or in combination with any other aspect, the crash discrimination metrics can have a value determined by comparing acceleration vs. displacement or velocity vs. displacement, as measured by the crash sensors, and the crash discrimination metrics can determine the occurrence of a frontal collision in response to the value exceeding the threshold.

According to another aspect, alone or in combination with any other aspect, the active sensor can be a camera, and wherein the information obtained from the active sensor can be the object type, an object lateral position, a time to collision (TTC) with the object, a relative velocity of the object and the vehicle, and/or a longitudinal position of the object relative to the vehicle.

According to another aspect, alone or in combination with any other aspect, the algorithm for detecting the object in the path of the vehicle can be configured to detect the object by determining whether the object type is a recognized object type; determining whether the object lateral position is within a predetermined threshold range; determining whether the TTC with the object is within a threshold indicative of an impending collision by evaluating a TTC collision discrimination metric to determine whether the TTC exceeds a predetermined threshold, the threshold being determined with respect to the relative velocity of the object and the vehicle; and determining whether the longitudinal position of the object relative to the vehicle is within a threshold indicative of an impending collision by evaluating a longitudinal distance collision discrimination metric to determine whether the longitudinal distance between the object and the vehicle exceeds a predetermined threshold, the threshold being determined with respect to the relative velocity of the object and the vehicle.

According to another aspect, alone or in combination with any other aspect, the active sensor can be a radar sensor. The information obtained from the active sensor can be an object state, a collision probability, a time to collision (TTC) with the object, and a relative velocity of the object and the vehicle.

According to another aspect, alone or in combination with any other aspect, the algorithm for detecting the object in the vehicle path is configured to detect the object by determining whether the object state is a recognized object state; determining whether the collision probability is greater than a predetermined threshold probability; and determining whether the TTC with the object is within a threshold indicative of an impending collision by evaluating a TTC collision discrimination metric to determine whether the TTC exceeds a predetermined threshold, the threshold being determined with respect to the relative velocity of the object and the vehicle.

According to another aspect, alone or in combination with any other aspect, the recognized object state can be a forward state, backward state, sideways state, stationary state, or moving state.

According to another aspect, alone or in combination with any other aspect, the active sensor can be at least one of a camera, a radar sensor, and a laser radar (LIDAR) sensor.

According to another aspect, alone or in combination with any other aspect, the controller can be an airbag controller unit (ACU).

DESCRIPTION

In this description, reference is sometimes made to the left and right sides of a vehicle. These references should be understood as being taken with reference to the forward direction of vehicle travel. Thus, reference to the "left" side of a vehicle is meant to correspond to a driver side ("DS") of the vehicle. Reference to the "right" side of the vehicle is meant to correspond to a passenger side ("PS") of the vehicle.

Also, in this description, certain descriptions are made with respect to vehicle axes, specifically, the X-axis, Y-axis, and Z-axis of the vehicle. The X-axis is a central, longitudinally extending axis of the vehicle. The Y-axis is a laterally extending axis of the vehicle that is perpendicular to the X-axis. The Z-axis is a vertically extending axis of the vehicle that is perpendicular to both the X-axis and Y-axis. The X-axis, Y-axis, and Z-axis intersect at or approximate to a center of gravity ("COG") of the vehicle.

Vehicle Safety System

Figure 1:
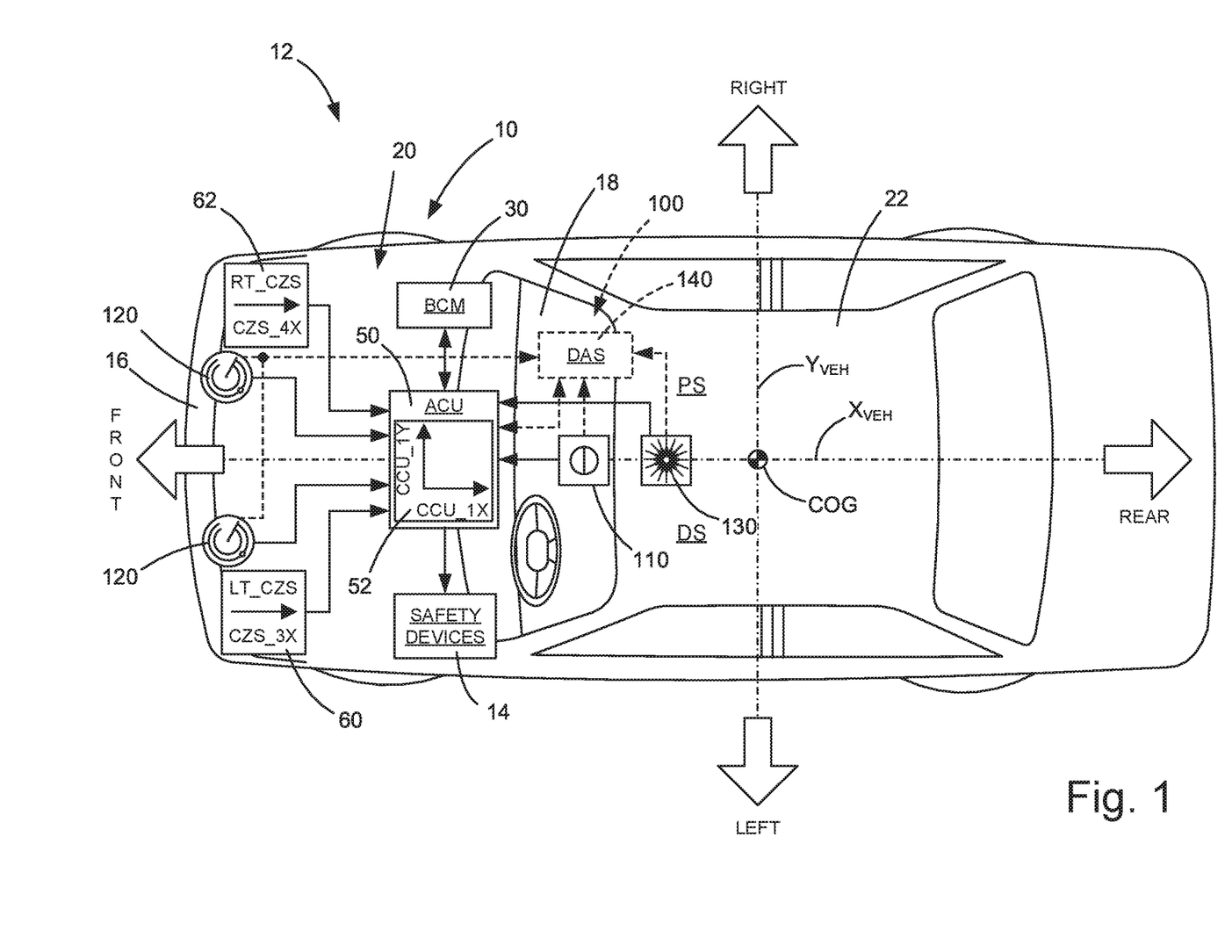
FIG. 1 is a schematic illustration of a vehicle including a vehicle safety system, according to one example configuration.

Referring to FIG. 1, by way of example, a vehicle 12 includes a vehicle safety system 10, which includes a passive safety system 20 and an active safety system 100. The passive safety system 20 includes actuatable vehicle occupant protection devices, which are illustrated schematically at 14. The protection devices 14 can include any actuatable vehicle occupant protection device, such as frontal airbags, side airbags, curtain air bags, knee bolster air bags, actuatable seatbelt pre-tensioners and/or retractors. The passive safety system 20 also includes an airbag electronic control unit (referred to herein as an airbag controller unit or "ACU") 50 that is operatively connected to the protection devices 14. The ACU 50 is operative to control the actuation of the protection devices 14 in response to vehicle conditions sensed via one or more sensors to which the ACU is operatively connected.

The passive safety system 20 includes several sensors, such as accelerometers and/or pressure sensors, for measuring certain conditions of the vehicle 12 that are utilized to determine whether to actuate the vehicle occupant protection devices 14. These sensors can be mounted at various locations throughout the vehicle 12 selected to allow for sensing the particular vehicle condition for which the sensor is intended. In this description, the vehicle safety system 10 is described as including several crash sensors of different types and locations in the vehicle 12. The crash sensors described herein are not necessarily a complete list of sensors included in the vehicle safety system 10. The sensors described herein are only those utilized by the invention to detect the occurrence of a front impact. Those skilled in the art will therefore appreciate that the vehicle safety system 100 can include one or more other crash sensors of any type, in any number, and in any location in the vehicle 12.

The passive safety system 80 is implemented in the ACU 50 and utilized to detect the occurrence of a frontal vehicle impact. For this purpose, the vehicle safety system 10 includes a left crush zone sensor 60 and a right crush zone sensor 62. The left and right crush zone sensors 60, 62 are accelerometers configured to sense vehicle accelerations and transmit signals indicative of those accelerations to the ACU 50. The ACU 50 is configured to determine whether the magnitude of the sensed accelerations meets or exceeds a threshold sufficient to indicate that a crash event has taken place and to actuate the safety devices in response to that determination.

In FIG. 1, the crush zone sensors 60, 62 are single axis accelerometers configured to detect accelerations in directions parallel to the longitudinal axis $X_{VEH}$, which are indicated generally by the arrows LT_CZS and RT_CZS, respectively, shown in schematic representation of the sensors. The left and right crush zone sensors 60, 62 are positioned at or near the left (DS) and right (PS) front corners, respectively, of the vehicle 12. The left and right crush zone sensors 60, 62 can, for example, be mounted behind a front bumper 16 of the vehicle at these front corner locations. The ACU 50 includes an integrated 2-axis accelerometer 52 for sensing vehicle accelerations along the X-axis and Y-axis. These accelerations are shown at CCU_X and CCU_Y, respectively.

The vehicle safety system 10 is implemented and configured to cooperate with other vehicle systems. The ACU 50 can be operatively connected, for example, via a vehicle controller area network (CAN) bus, to a vehicle body control module (BCM) 30. The BCM 30 can communicate via the CAN bus with other vehicle systems, such as chassis control, stability control, traction/skid control, anti-lock braking (ABS), tire pressure monitoring (TPMS), navigation systems, instrumentation (speed, throttle position, brake pedal position, etc.), information and entertainment ("infotainment") systems, and other systems. Through the CAN bus interface, the ACU 50 can communicate with any of these external systems to provide and/or receive data.

Referring still to FIG. 1, the active safety system 100 can be of a known configuration, including one or more active safety system components configured to provide active safety functionality in a known manner. The active safety system 100 can utilize components of a driver assist system (DAS), which, as the name implies, provide assistance to the vehicle operator while driving. These components can help provide DAS functionality, such as such active cruise control, lane departure, blind spot monitoring, parking assist, etc. These components can even be those used to provide automated driving capabilities and therefore can provide vast amounts of information regarding the vehicle surroundings using artificial intelligence (AI) and other machine learning techniques. For crash avoidance functionality, the active safety system can provide crash warnings (audible, visual, tactile), automatic emergency braking, and automatic emergency steering.

The active safety system 100 includes components in the form of, for example, camera sensors, radar sensors, and laser radar (LIDAR) sensors. A camera sensor 110 is mounted in a forward-facing manner high on the windshield 18, e.g., behind or in the area of a rearview mirror. Radar sensor(s) 120 can be front mounted, in the area of the bumper 16, e.g., in the grille. A laser radar (LIDAR) sensor 130 can be mounted on or near the vehicle roof 22.

Camera sensors 110 are effective in providing a wide field-of-view, with the ability to identify various objects/obstacles with a high degree of accuracy. Cameras can also determine whether an object/obstacle is in the path of the vehicle 12. Cameras also require good visibility and suffer in dark conditions, fog, rain, snow, etc. Radar sensors 120 do not suffer in poor visibility conditions and do provide accurate indications of time-to-collision (TTC). Radar sensors 120 are, however, less capable in terms of discerning between different types of objects/obstacles and are not as adept as cameras in determining whether an object/obstacle is in the path of the vehicle 12. LIDAR sensors 130 provide 3-D sensing capability for TTC and vehicle path determination, provide good object/obstacle recognition, and are robust in both good and poor visibility situations.

The camera 110, radar sensor 120, and LIDAR sensor 130 can be connected to a separate controller, such as a DAS controller 140, and that controller can communicate with the ACU 50 via the CAN bus. Alternatively, both the active and passive safety functionality can be handled by a single controller, such as the ACU 50, in which case, the camera 110, radar sensor 120, and LIDAR sensor 130 can be connected directly to the ACU 50. These sensors monitor an area in front of the vehicle 12, within a predetermined field of view and range of the vehicle.

The active safety system sensors provide information (signals, data, etc.) that a controller, such as the ACU 50, DAS controller 140, or other controller, can use detect the presence of objects in the vehicle path. Implementing known methods, such as artificial intelligence (AI) and other algorithms, the controller can determine information related to the detected object, such as the object type, longitudinal distance from the vehicle, lateral position in the vehicle path, time to collision with the vehicle, relative velocity with the vehicle, state of the object (e.g., forward-facing, backward-facing, sideways-facing, moving, stationary, etc.), and the probability that a collision will occur.

FIGS. 2-8 illustrate control algorithms implemented by the vehicle safety system 10 to help protect vehicle occupant(s) in the event of a frontal impact with the vehicle 12, referred to herein as a front or frontal crash. The algorithms are implemented in a vehicle controller, such as the ACU 50, which is operatively connected to the safety devices 14 and is configured to actuate the safety devices in response detecting the occurrence of a frontal crash. According to the invention, the control algorithms implemented in the vehicle safety system 10 are configured so that the passive safety system 20 adjusts or tailors its response to a frontal crash based on information obtained from the active safety system 100.

Control Algorithm Overview

Figure 2:
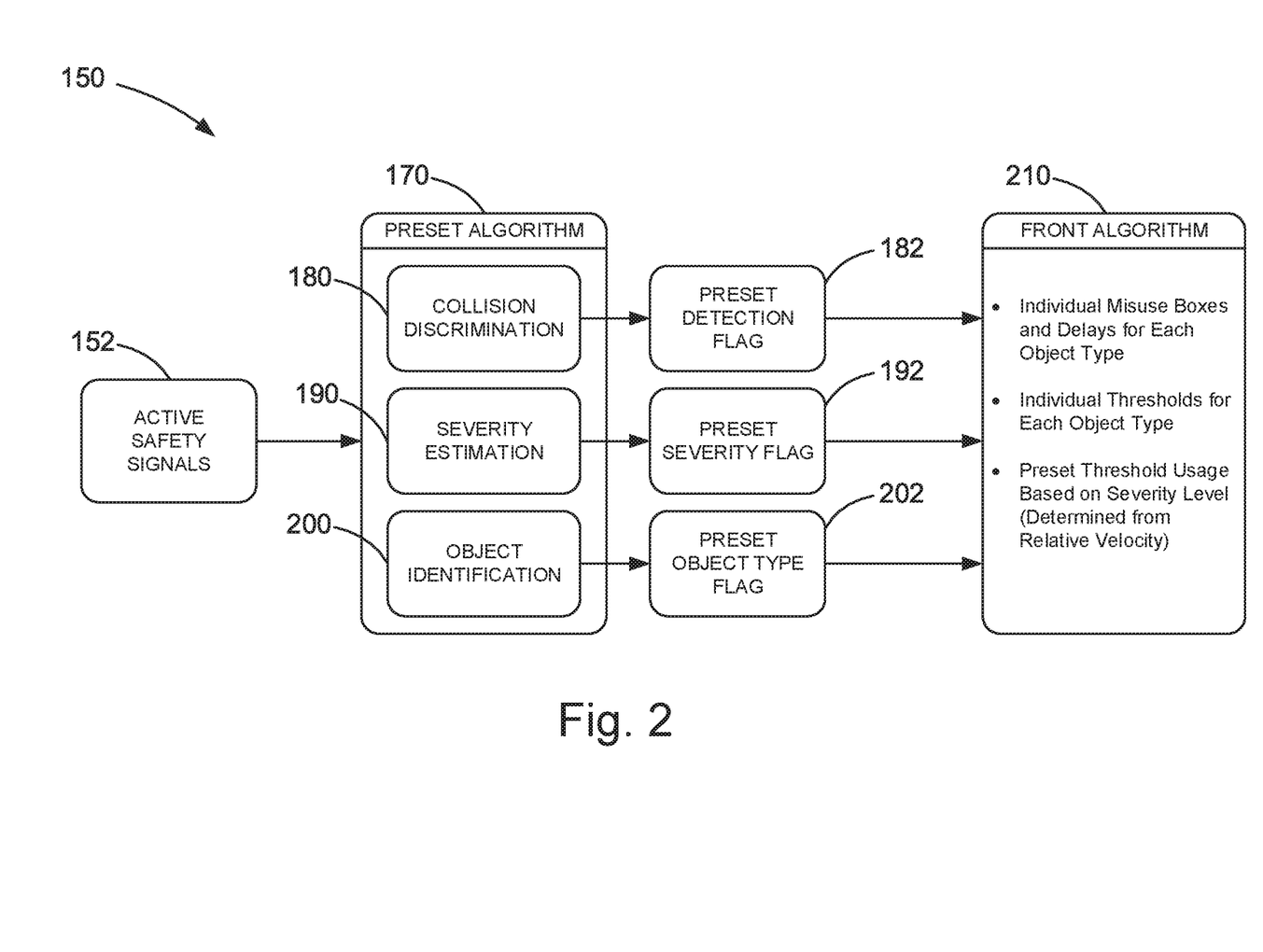
FIGS. 2-5 are schematic diagrams illustrating active safety control algorithms implemented in the vehicle safety system.

FIG. 2 illustrates an overview of the control algorithm 150 implemented by the vehicle safety system 10 to help protect vehicle occupant(s) in response to detecting the occurrence of a frontal crash. As shown in FIG. 2, active safety signals 152 from the active safety system 100 are provided to preset algorithms 170. The preset algorithms 170 include collision discrimination algorithms 180, severity estimation algorithms 190, and object identification algorithms 200. As shown in FIG. 2, the collision discrimination algorithms 180 produce a preset detection flag 182. The severity estimation algorithms 190 produce a preset severity flag 192. The object identification algorithms 200 produce a preset object type flag 202.

The control algorithm 150 also includes a front algorithm 210 that receives the preset detection flag 182, preset severity flag 192, and the preset object type flag 202 from the preset algorithms 170. The front algorithm 210 is the passive control algorithm that implements the metrics used to determine whether to deploy the safety devices 14 based on the signals received from the sensors. The front control algorithm 210 tailors these metrics based on the flags 182, 192, 202 produced by the preset algorithm 170 in response to the active safety signals 152. The front control algorithm 210 produces individual misuse boxes for each object type, individual thresholds for each object type, and individual thresholds for each severity level.

Collision Discrimination

Figure 3:
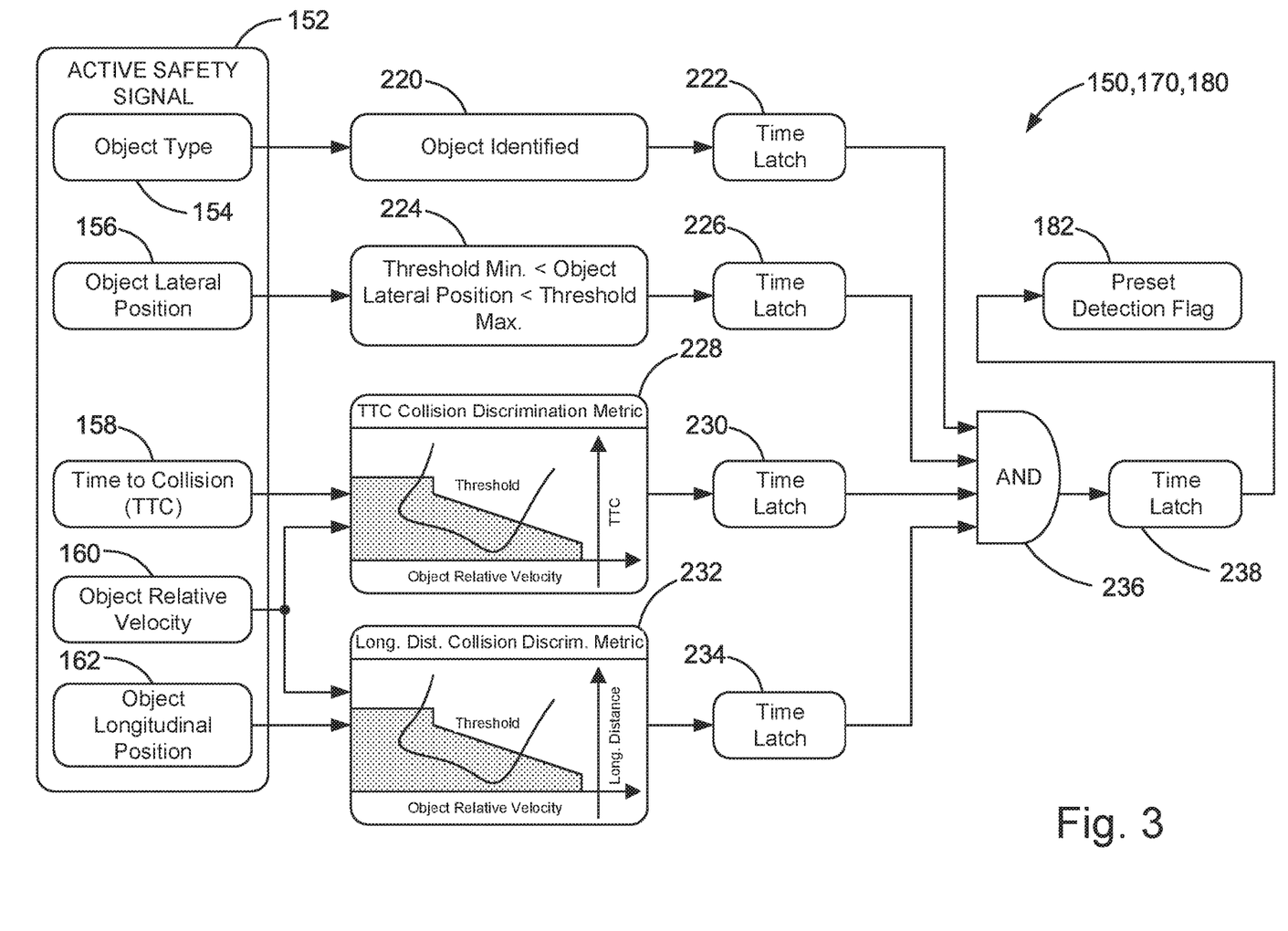
Figure 4:
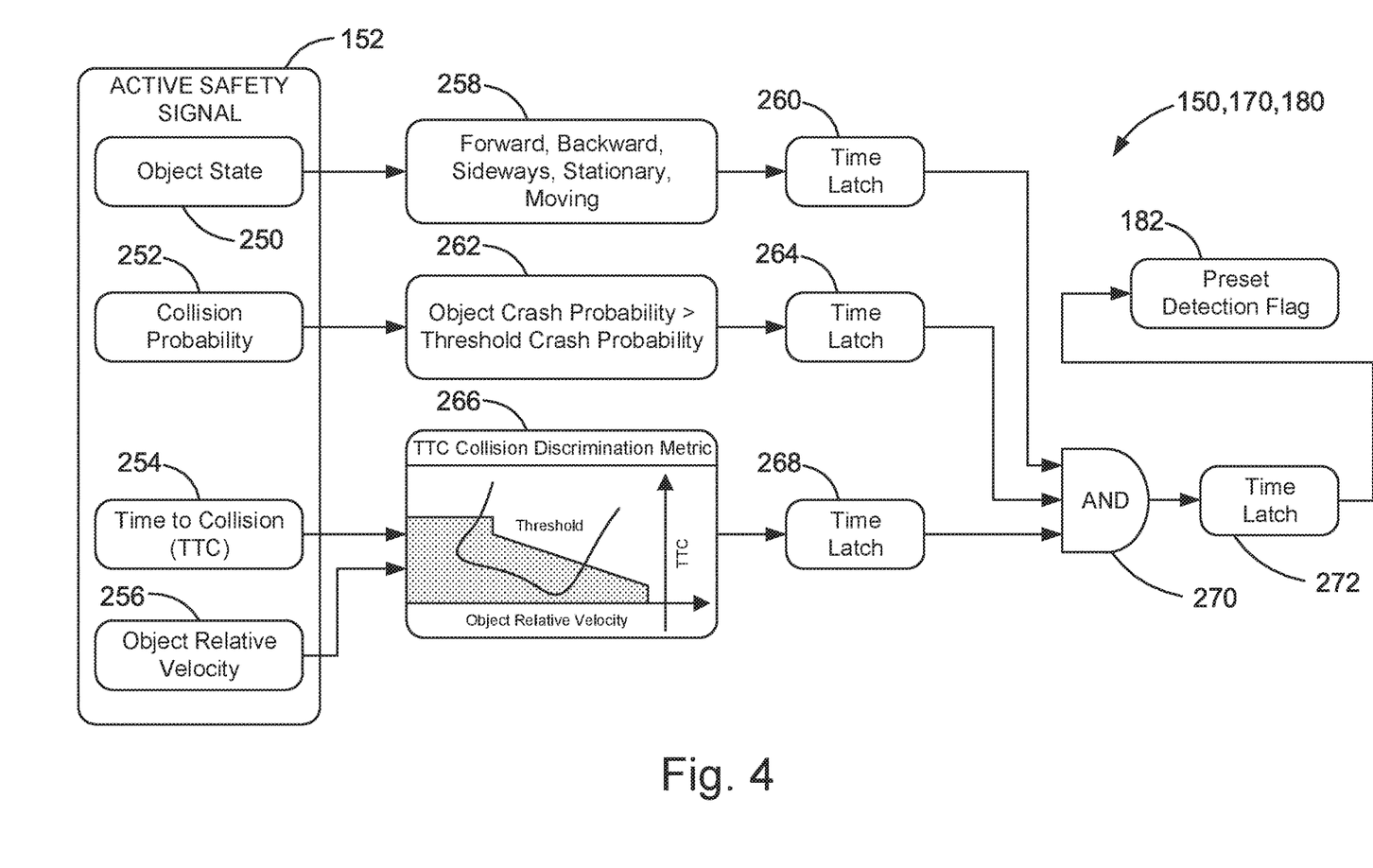

FIGS. 3 and 4 illustrate collision discrimination algorithms 180 that can be implemented in the preset algorithm 170 portion of control algorithm 150. The collision discrimination algorithms 180 of FIGS. 3 and 4 differ in the type of active safety sensor and the corresponding inputs provided to the algorithms. The collision discrimination algorithms 180 of FIGS. 3 and 4 can be implemented individually, in which case, the individual algorithm determines the preset detection flag. The collision discrimination algorithms 180 of FIGS. 3 and 4 can also be implemented in combination, in which case, either or both algorithms determine the preset detection flag.

The collision discrimination algorithm 180 of FIG. 3 utilizes the active safety signals 152 as inputs. In FIG. 3, the active safety signals 152 are those obtained from an active safety sensor in the form of a camera (see, e.g., camera 110 in FIG. 1). The active safety signals 152 include:
- Object type 154
- Object lateral position 156
- Time to collision (TTC) 158
- Object relative velocity 160
- Object longitudinal position 162

The collision discrimination algorithm 180 utilizes the active safety signals 152 to determine whether a preset condition is present. When a preset condition is present, the collision discrimination algorithm 180 has identified an object type and also determined that a collision is imminent. The collision discrimination algorithm 180 produces a preset detection flag 182 (see also FIG. 2) in response to ALL of the following conditions being true (see AND gate 236):
- Object identified (block 220) as a car, truck, barrier, pole, or "other."
- Object lateral position 154 greater than threshold minimum value and less than threshold maximum value (block 224).
- TTC collision discrimination metric indicates an imminent collision (metric 228).
- Longitudinal distance collision discrimination metric indicates an imminent collision (metric 232).
- Note that blocks 220, 224 and metrics 228, 232 are time latched at blocks 222, 226, 230, and 234, respectively. Therefore, once those conditions are satisfied or TRUE, they are time latched TRUE for a predetermined time period. These time latched values are seen at AND block 236.

The AND gate 236 receives the time latched values from blocks 222, 226, 230, and 234. Once the AND gate 236 is satisfied (TRUE) the preset detection flag 182 is triggered (TRUE). The preset detection flag 182 is time latched at block 238. Therefore, once AND block 236 is satisfied, the preset detection flag 182 is maintained TRUE for a predetermined time period.

The collision discrimination algorithm 180 of FIG. 4 also utilizes the active safety signals 152 as inputs. In FIG. 4, the active safety signals 152 are those obtained from an active safety sensor in the form of a radar sensor (see, e.g., radar sensors 120 in FIG. 1). The active safety signals 152 include:
- Object State 250
- Collision probability 252
- Time to collision (TTC) 254
- Object relative velocity 256

The collision discrimination algorithm 180 utilizes the active safety signals 152 to determine whether a preset condition is present. When a preset condition is present, the collision discrimination algorithm 180 has identified an object type and also determined that a collision is imminent. The collision discrimination algorithm 180 produces a preset detection flag 182 (see also FIG. 2) in response to ALL of the following conditions being true (see AND gate 270):
- Object state identified (block 258) as moving forward, moving backward, or stationary.
- Collision probability>threshold collision probability (block 262).
- TTC collision discrimination metric indicates an imminent collision (metric 266).
- Note that blocks 258, 262 and metric 266 are time latched at blocks 260, 264, and 268, respectively. Therefore, once those conditions are satisfied or TRUE, they are time latched TRUE for a predetermined time period. These time latched values are seen at AND block 270.

The AND gate 270 receives the time latched values from blocks 260, 264, and 268. Once the AND gate 270 is satisfied (TRUE) the preset detection flag 182 (see also FIG. 2) is triggered (TRUE). The preset detection flag 182 is time latched at block 272. Therefore, once AND block 270 is satisfied, the preset detection flag 182 is maintained TRUE for a predetermined time period.

Severity Estimation

Figure 5:
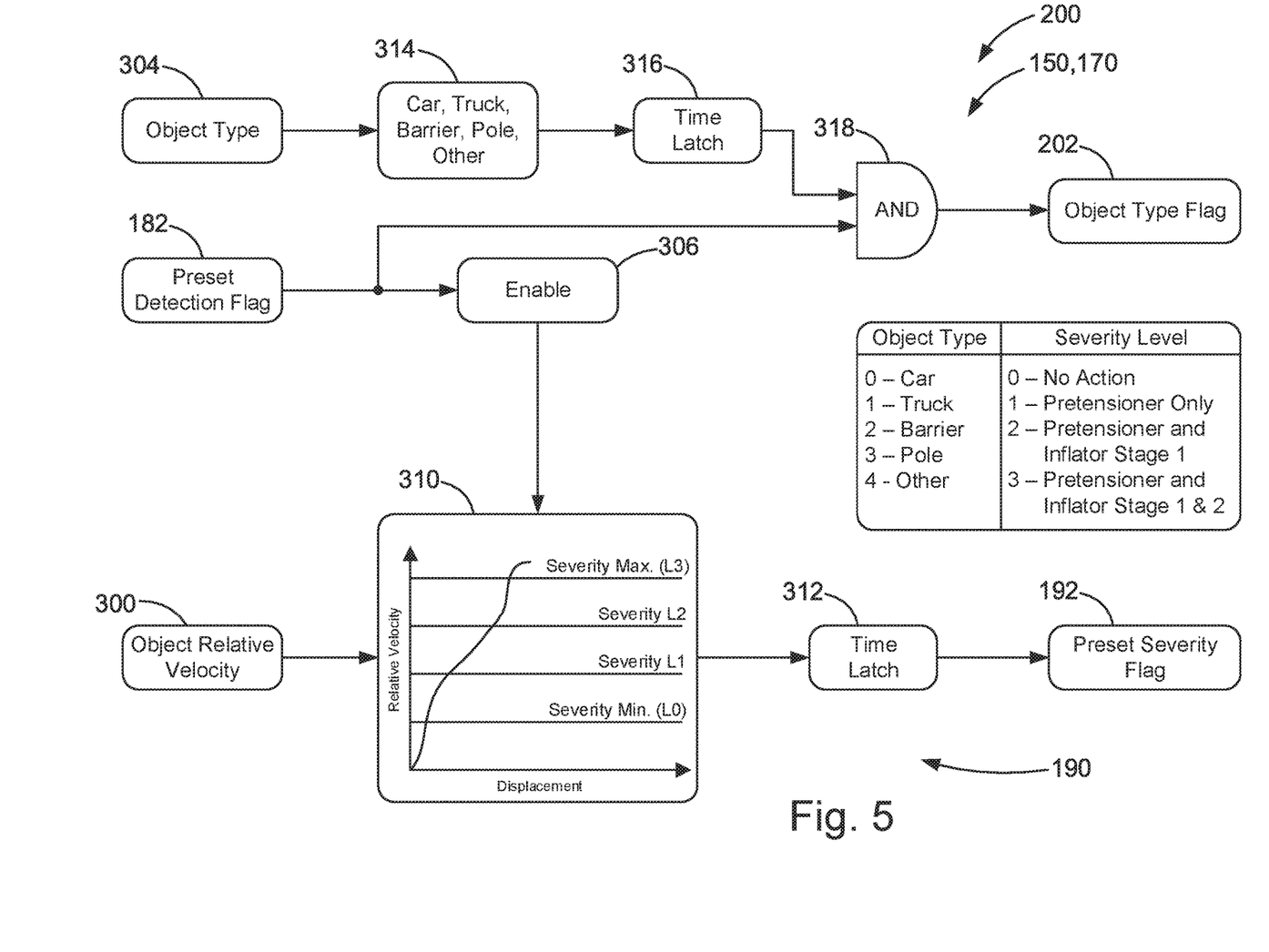

FIG. 5 illustrates the severity estimation algorithm 190 portion of the preset algorithm 170 portion of control algorithm 150. The severity estimation algorithm 190 implements a severity metric 310 that evaluates the object relative velocity 300 (obtained from the active safety signals 152) to determine whether severity thresholds are exceeded. The severity metric 300 is enabled (block 306) by the preset detection flag 182 (see FIGS. 3 and 4). The severity metric 300 can include any number of severity levels. In the example configuration of FIG. 5, the severity metric 300 includes four thresholds:
- Severity Minimum (L0)
- Severity Level 1 (L1)
- Severity Level 2 (L2)
- Severity Maximum (L3)

The severity metric 300 outputs the severity level, which is time latched at block 312 and outputted as the preset severity flag 192 (see also FIG. 2). As shown in the table of FIG. 5, the severity levels of the preset severity flag 192 can be associated with a corresponding response (i.e., deployment scheme for the safety devices 14) of the passive safety system 20. For example, as shown in FIG. 5, these responses can be:
- Severity Minimum (L0)=No action.
- Severity Level 1 (L1)=Seatbelt pretensioners only.
- Severity Level 2 (L2)=Seatbelt pretensioners and airbag inflator stage 1 only.
- Severity Maximum (L3)=Seatbelt pretensioners and airbag inflator stages 1 and 2.

Object Identification

FIG. 5 also illustrates the object identification algorithm 200 portion of the preset algorithm 170 portion of control algorithm 150. The object identification algorithm 200 utilizes the object type 304 (obtained from the active safety signals 152) and the preset detection flag 182 (see FIGS. 3 and 4). The object type flag 202 is outputted in response to AND gate 318, which is TRUE when the preset detection flag 182 is TRUE and when time latch 316 latches in a detected object type 314. The object type 314 can be a car, truck, barrier, pole, or, in the absence of detecting none of these, "other."

The object identification algorithm 200 outputs the object type flag 202, which indicates the type of object determined. These object types are shown in the table of FIG. 5 as:
- Object Type 0=Car.
- Object Type 1=Truck.
- Object Type 2=Barrier.
- Object Type 3=Pole.
- Object Type 4=Other.

Crash Signal Conditioning

Figure 6:
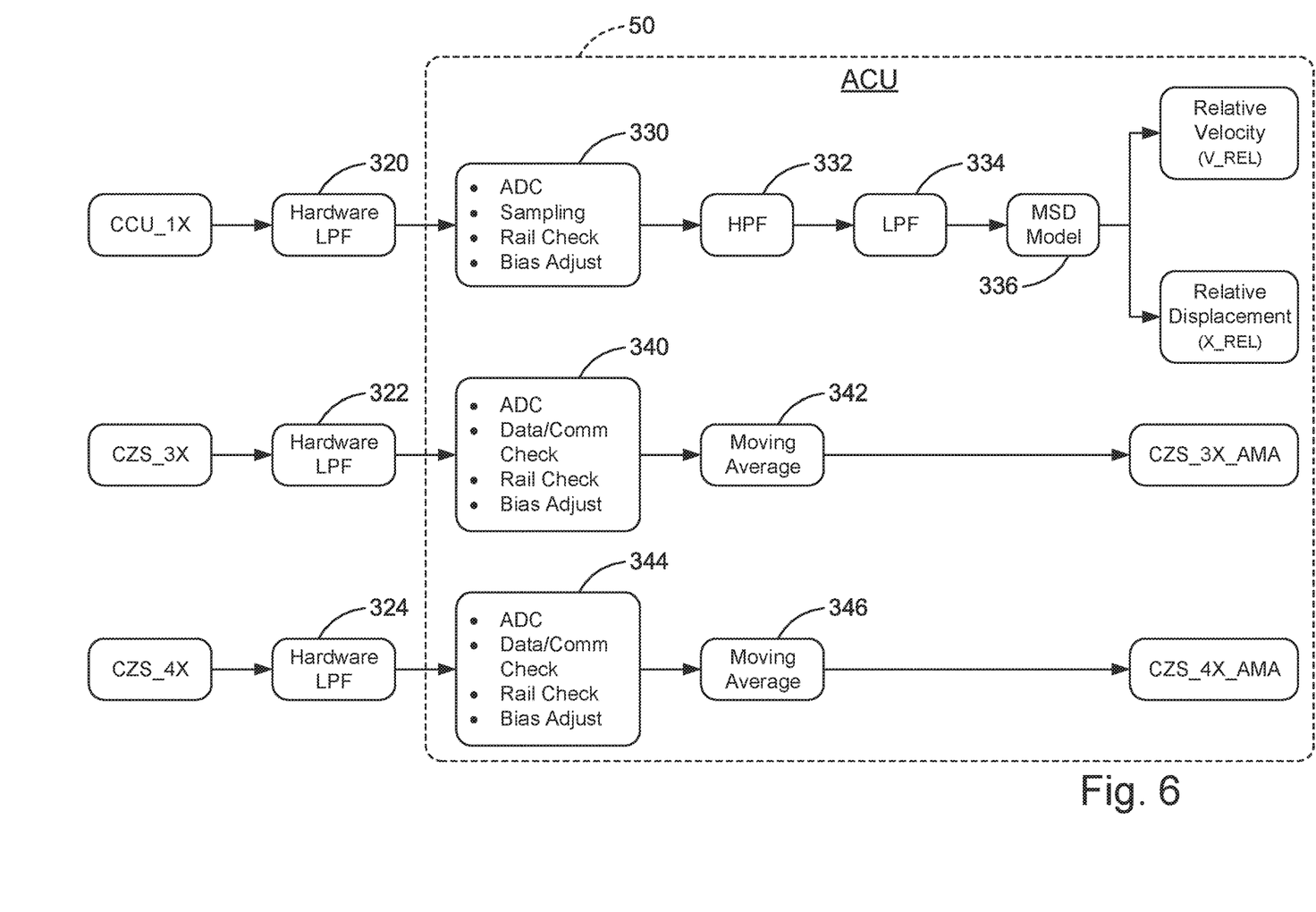
FIG. 6 is a schematic diagram illustrating the conditioning of crash signals implemented in the vehicle safety system.

The crash signals CCU_1X, CZS_3X, and CZS_4X generated by the crash sensors 50, 60, 62 are conditioned for use by the vehicle safety system 10 in a known manner. By way of example, FIG. 6 illustrates how the crash signals are conditioned for use in the control algorithm 150, specifically in the front algorithm 210 (see FIG. 2). The crash signals CCU_1X, CZS_3X, and CZS_4X are initially conditioned by hardware low-pass filters (LPF), as shown at 320, 322, 324, respectively, and those signals are transmitted to the ACU 50 for further conditioning.

As shown at block 330, the low-pass filtered CCU_1X undergoes analog-to-digital (ADC) conversion at a predetermined frequency/sampling rate. Other conditioning, such as rail checks, and bias adjustments, can also be performed. The conditioned CCU_1X from block 330 can also be further conditioned with high-pass filtering (HPF) 332 and low-pass filtering (LPF) 334. The conditioned CCU_1X is provided to damped spring mass (MSD) model 336, which uses damped spring mass modeling to produce modeled values for relative velocity (V_REL) and relative displacement (X_REL) resulting from the impact that produced the CCU_1X acceleration. This can be done according to known modeling methods, based on particular vehicle architectures and based on occupants having specified characteristics. Examples of this signal condition and modeling are described in detail in U.S. Pat. No. 5,935,182 to Foo et al. and U.S. Pat. No. 6,036,225 to Foo et al. The disclosures of these patents are hereby incorporated by reference in their entireties.

As shown at block 340, the low-pass filtered CZS_3X undergoes analog-to-digital (ADC) conversion at a predetermined frequency/sampling rate. Other conditioning, such as rail checks, and bias adjustments, can also be performed. At block 342, a moving average of the conditioned CZS_3X from block 340 is calculated to produce CZS_3X_AMA. Similarly, as shown at block 344, the low-pass filtered CZS_4X undergoes analog-to-digital (ADC) conversion at a predetermined frequency/sampling rate. Other conditioning, such as rail checks, and bias adjustments, can also be performed. At block 346, a moving average of the conditioned CZS_4X from block 344 is calculated to produce CZS_4X_AMA.

Conventional Switched Crash Discrimination

Figure 7A:
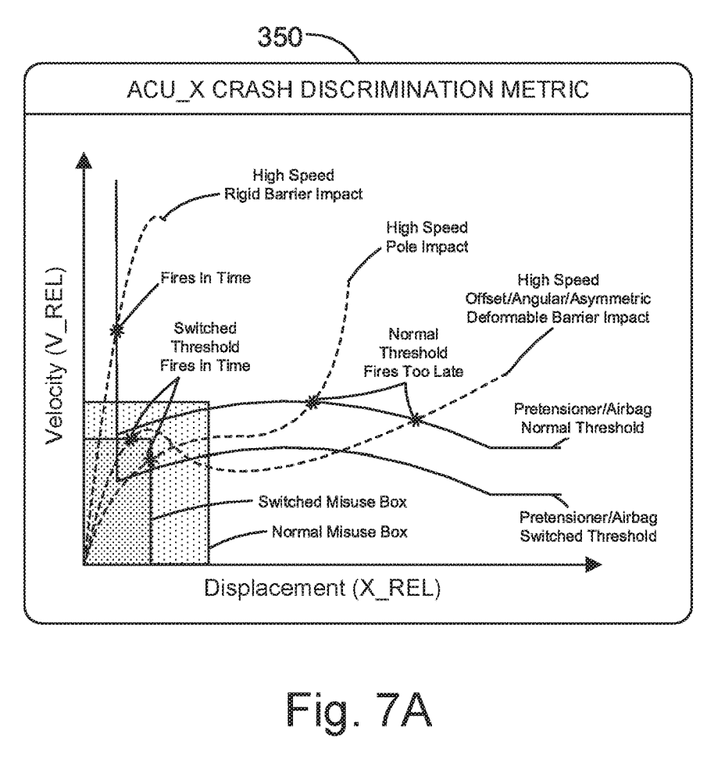
FIGS. 7A-7B are schematic diagrams illustrating known crash discrimination metrics implemented in vehicle safety systems.
Figure 7B:
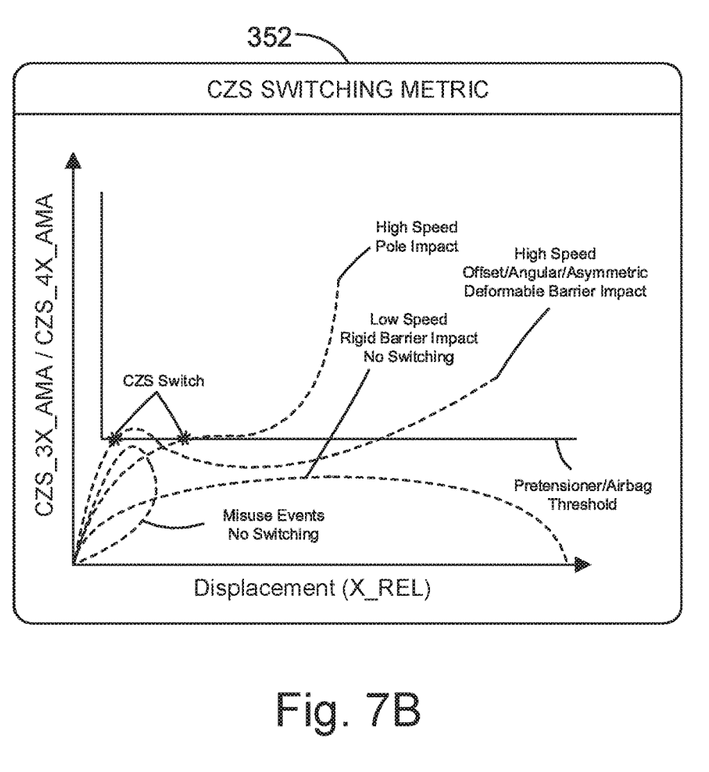

FIGS. 7A and 7B illustrate a conventional front crash discrimination scheme that utilizes the conditioned crash signals V_REL, X_REL, CZS_3X_AMA, and CZS_4X_AMA determined in FIG. 6 to discriminate amongst various front crash types. FIG. 7A illustrates an ACU_X crash discrimination metric, which utilizes ACU_X only, i.e., utilizes a metric that evaluates V_REL vs. X_REL to discriminate whether a front crash has occurred. When the crash discrimination metric 350 exceeds a normal threshold, a frontal collision is detected and the safety devices (airbags, seatbelt pretensioners) are deployed. The crash discrimination metric also implements misuse boxes to filter vehicle misuse scenarios (e.g., off-road use, reckless driving) from being identified as crashes. Accordingly, for a front crash to be detected, the metric must both exit the misuse box and cross the normal threshold, in any order. FIG. 7B illustrates CZS switching metrics 352 used to switch the crash thresholds and misuse boxes implemented in the crash discrimination metric 350.

The thresholds and misuse boxes shown in FIGS. 7A and 7B, and in any other figures in this description for that matter, are for illustrative purpose and by way of example only. Those skilled in the art will appreciate that the characteristics of the thresholds and misuse boxes (e.g., shape, limits, range, number, etc.) can vary widely depending on a variety of factors, such as the particular vehicle platform in which the vehicle safety system 10 is implemented, and the safety standards (e.g., NHTSA) for which the vehicle safety system is designed to meet.

The front crash discrimination scheme can be required to detect the occurrence of a variety frontal crash types, such as rigid barrier, pole, offset, angular, and asymmetric, of various magnitudes dictated by speed. To be effective, the crash discrimination metric 350 must not only detect the occurrence of the crash, but must do so within a timeframe that the safety devices can be deployed and provide effective passenger protection. Each crash type produces metrics having different signatures, some of which are illustrated in FIG. 7A. For some of these crash types, the normal threshold can be effective in detecting the occurrence of the crash within the required time period ("in time"). For other crash types, the normal threshold might not be effective in detecting the occurrence of the crash within the required time period ("too late").

FIG. 7A illustrates example metrics for three types of front crashes: a high speed rigid barrier impact, a high speed pole impact, and a high speed offset/angular/asymmetric impact. A high speed rigid barrier impact can, for example, be a 56 kph, zero degree offset, rigid barrier collision. A high speed pole impact can, for example, be a 48 kph, zero degree offset, pole collision. An offset impact can, for example, be a 56-64 kph, 40 percent offset, deformable barrier collision. The vehicle safety system can be designed to meet various safety standards, such as those set forth by the National Highway Traffic Safety Administration ("NHTSA"). The goal is for the crash discrimination metric 350 to detect as many of these as possible.

As shown in FIG. 7A, the normal threshold and normal misuse box are effective at discriminating the high speed rigid barrier impact event, i.e., the metric fires in time, as indicated by the star labeled as such. For both the high speed pole impact and the high speed offset/angular/asymmetric impact, however, the normal threshold and normal misuse box are not effective, and the metric fires too late, as indicated by the stars labeled as such.

To account for this, conventional front crash discrimination scheme of FIGS. 7A and 7B implements CZS switching metrics 352 (FIG. 7B) to switch the crash thresholds and misuse boxes implemented in the crash discrimination metric 350 (FIG. 7A). As shown in FIG. 7B, the CZS switching metric 352 utilizes a metric that evaluates CZS_3X_AMA/CZS_4X_AMA vs. X_REL to determine whether to switch the threshold and misuse box implemented in the crash discrimination metric 350 (FIG. 7A) from the normal threshold and misuse box to the switched threshold and misuse box. As shown in FIG. 7B, the threshold is configured to avoid triggering on misuse events and low magnitude events, such as low speed rigid barrier impacts (e.g., a 10-16 kph, zero percent offset rigid barrier impact).

The CZS switching metric 352 indicates a CZS switch (indicated by the stars in FIG. 7B) when the metric crosses the threshold. For the events that fire too late in the crash discrimination metric 350 (i.e., the high speed pole impact and the offset/angular/asymmetric deformable barrier impact), the CZS switching metric 352 indicates the switch earlier in time. As a result, CZS switching can be used to switch the threshold and misuse box implemented in the crash discrimination metric 350 from the normal threshold and misuse box to the switched threshold and misuse box. As shown in FIG. 7A, the switched threshold fires in time for both the high speed pole impact and the offset/angular/asymmetric deformable barrier impact.

Active Switching

Figure 8A:
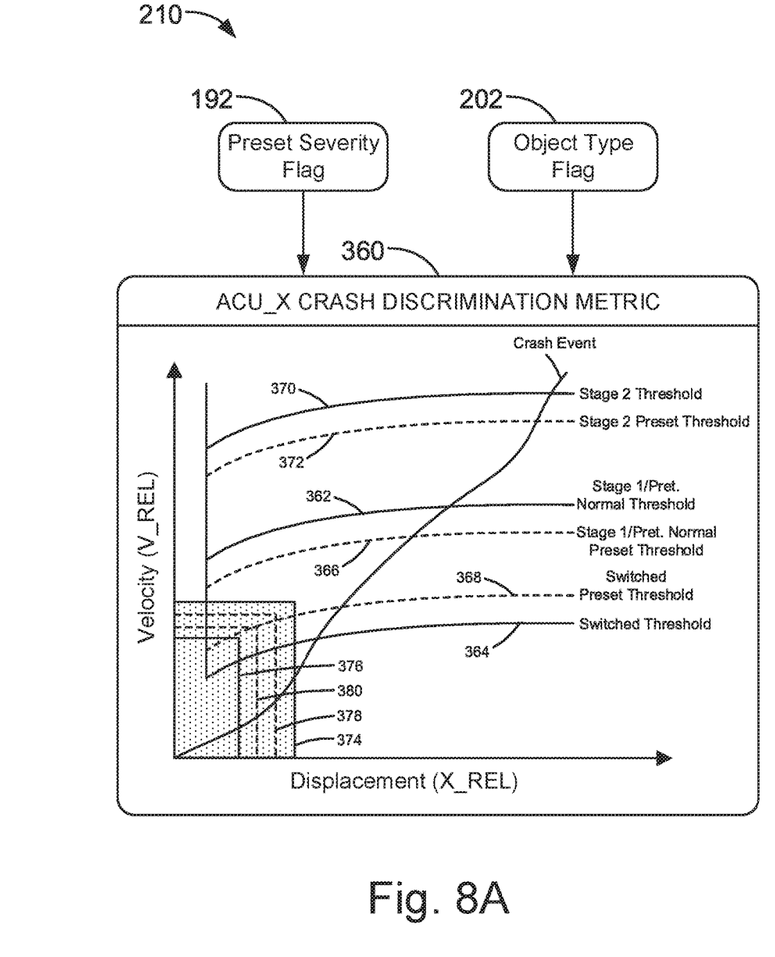
FIGS. 8A-8B are schematic diagrams illustrating crash discrimination metrics including active switching features that is implemented in the vehicle safety system.
Figure 8B:
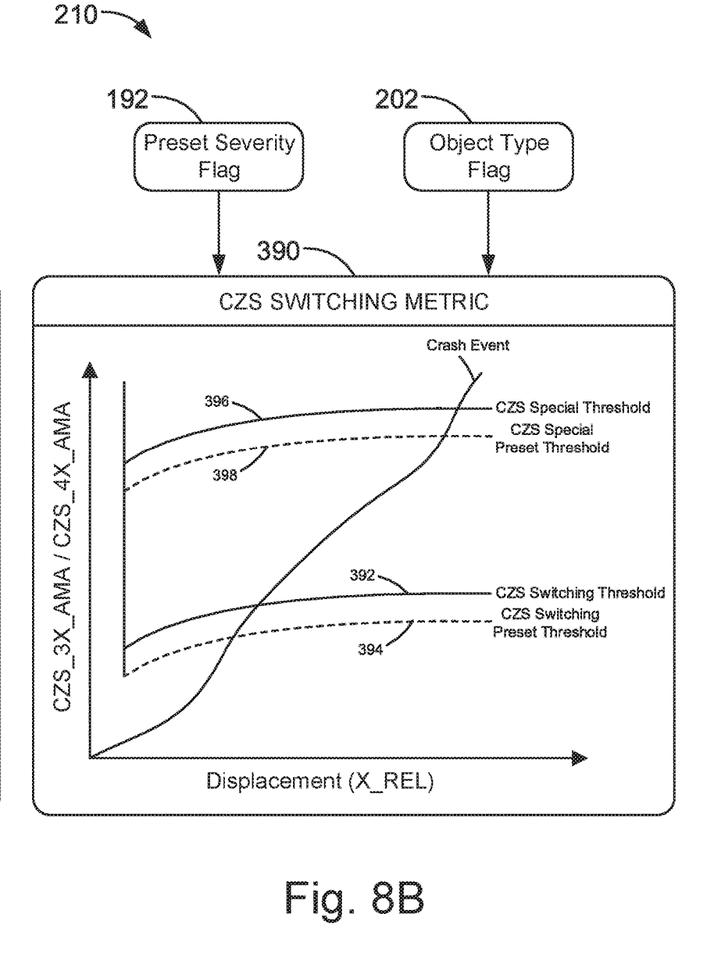

The front algorithm 210 is illustrated in FIGS. 8A and 8B. The front algorithm 210 implements the conventional switched crash discrimination algorithms described above. Advantageously, in addition to the CZS switching described above, the front algorithm 210 also implements active threshold switching in response to the preset algorithm 170. More specifically, the front algorithm 170 implements active threshold switching in response to the preset severity flag 192 and object type flag 202 in order to tune the crash discrimination metrics and misuse boxes to impending collisions with identified objects and the predicted severity with which the collision will take place.

FIGS. 8A and 8B illustrate a front crash discrimination scheme or method implemented by the front algorithm 210. The front algorithm 210 implements active threshold switching in crash discrimination metrics used to detect the occurrence of a front crash. The crash discrimination metrics utilize the conditioned crash signals V_REL, X_REL, CZS_3X_AMA, and CZS_4X_AMA determined in FIG. 6 to discriminate amongst various front crash types. FIG. 8A illustrates an ACU_X crash discrimination metric 360, which utilizes ACU_X only, i.e., utilizes a metric that evaluates V_REL vs. X_REL to discriminate whether a front crash has occurred. FIG. 8B illustrates CZS switching metrics 390 used to switch the crash thresholds and misuse boxes implemented in the crash discrimination metric 350. As shown in FIGS. 8A and 8B, the metrics 360, 390 implement active switching in response to the preset severity flag 192 and the object type 202.

It bears repeating here that the thresholds and misuse boxes shown in FIGS. 8A and 8B are for illustrative purpose and by way of example only. Those skilled in the art will appreciate that the characteristics of the thresholds and misuse boxes (e.g., shape, limits, range, number, etc.) can vary widely depending on a variety of factors, such as the particular vehicle platform in which the vehicle safety system 10 is implemented, and the safety standards (e.g., NHTSA) for which the vehicle safety system is designed to meet.

According to the invention, the object type flag 202 is operative to switch the crash discrimination and switching metrics 360, 390 based on the type of object identified by the object identification algorithm 200 (see FIG. 5). The object type flag 202 can be operative to select the metrics 360, 390 implemented by the front algorithm. In other words, the front algorithm 210 can implement multiple versions of the ACU_X crash discrimination metric 360 and the CZS switching metrics 390 associated with one of the object types identified by the object type flag 202. Referring to FIG. 5, these object types can, for example, be a car, truck, barrier, pole, or other. Thus, based on the object type flag, the front algorithm 210 can select the metrics 360, 390, and all of the thresholds associated therewith, based on the flagged object type.

Referring to FIG. 8A, the ACU_X crash discrimination metric 360 implements a stage 1/pretensioner normal threshold 362 and a switched threshold 364. The ACU_X crash discrimination metric 360 also includes a normal misuse box 374 and a switched misuse box 376. These normal/switched thresholds and misuse boxes correspond to the those described above in reference to FIG. 7A. Whether the normal or switched thresholds and misuse box are used depends on the CZS switching metric 390 (FIG. 8B), particularly whether the CZS switching threshold 392 has been crossed. This corresponds to the CZS switching threshold described above in reference to FIG. 7B. When the CZS switching threshold 392 is crossed, the crash discrimination metric 360 uses the switched threshold 364 and the switched misuse box 376.

It should be noted here that the CZS switching metric 390 shown in FIG. 8B is actually representative of two metrics—one utilizing CZS_3X_AMA and one that utilizes CZS_4X_AMA, as shown on the vertical axis of the metric. Either metric can cause the described CZS switching in the ACU_X crash discrimination metric 360.

According to the invention, the thresholds implemented in the ACU_X crash discrimination metric 360 and the CZS switching metric 390 can also be switched to preset thresholds and corresponding misuse boxes in response to the preset severity flag 192. To which preset thresholds and misuse boxes the metrics 360, 390 are switched depends on the preset severity flag 192 determined by the severity estimation algorithm 190 (see FIG. 5). The switched thresholds and misuse boxes are indicated in FIGS. 8A and 8B by dashed lines. Referring to FIG. 8A, the ACU_X crash discrimination metric 360 includes a stage 1/pretensioner normal preset threshold 366 with a corresponding normal preset misuse box 378, and a switched preset threshold 368 with a corresponding switched preset misuse box 380. Similarly, the CZS switching metric 390 includes a CZS switching preset threshold 394.

Whether the thresholds implemented in the ACU_X crash discrimination metric 360 and the CZS switching metric 390 are the preset thresholds 366, 368, 394 and preset misuse boxes 378, 380 depends on the preset severity flag 192. The preset severity flag can be configured to indicate two or more severity levels. In the example configuration illustrated in FIG. 5, there can be four severity levels: 0=no action, 1=pretensioner only, 2=pretensioner and inflator stage 1, and 3=pretensioner and inflator stages 1 and 2. The metrics 360, 390 can be configured individually to switch to the preset thresholds and misuse boxes in response to any of the severity levels indicated in the preset severity flag 192.

For example, referring to the ACU_X crash discrimination metric 360, the switched threshold 364 can be switched to the switched preset threshold 368 and switched preset misuse box 380 in response to the preset severity flag being ≥1. The stage 1/pretensioner normal threshold 362 can be switched to the stage 1/pretensioner normal preset threshold 366 and normal preset misuse box 378 in response to the preset severity flag being ≥1. Referring to the CZS switching metric 390, the CZS switching threshold 392 can be switched to the CZS switching preset threshold 394 in response to the preset severity flag being ≥1. As shown in FIGS. 8A and 8B, the switched thresholds can have magnitudes that are less than or greater than their counterpart normal thresholds, although reduced magnitude switched thresholds are the more likely scenario. Similarly, the switched misuse boxes can be larger or smaller than their counterpart normal misuse boxes.

From the above, it will be appreciated that not only can the front algorithm 210 implement CZS switching to help account for different front crash types based on passive sensing, but also that the front algorithm can implement active switching to account for object types and estimated crash severity based on active sensing.

Referring to FIG. 8A, the ACU_X crash discrimination metric 360 can also include a stage 2 threshold 370 for safety systems in which the airbag inflator is a two stage inflator. The second stage of the airbag inflator is used in more severe crashes, which explains the comparatively high magnitude of the stage 2 threshold 370. In this configuration, the stage 1/pretensioner normal threshold 362 is implemented to fire the pretensioner and stage 1 of the airbag inflator. The stage 2 threshold 370 is implemented to fire stage 2 of the airbag inflator after a predetermined time delay, which can, for example, be 5 ms, 20 ms, 100 ms, etc. As shown in FIG. 8A, the ACU_X crash discrimination metric 360 can also include a stage 2 preset threshold 372 that can be switched in response to the preset severity flag being a predetermined value, such as ≥2, thus lowering the threshold for stage 2 firing in response to a high flagged crash severity level.

Although not shown, the ACU_X crash discrimination metric 360 can implement misuse boxes that correspond to the stage 2 threshold 370 and stage 2 preset threshold 372. Due, however, to the high magnitudes necessary to trigger a stage 2 event, these misuse boxes may not be necessary.

Additionally, referring to FIG. 8B, the CZS switching metric 390 can also include a CZS special threshold 396 for safety systems in which the airbag inflator is a two stage inflator. In this configuration, the CZS special threshold 396 can be implemented to adjust or tune the firing delay between stage 1 and stage 2 of the inflator. The delay can be increased or decreased in response to the CZS special threshold 396 being exceeded. As shown in FIG. 8B, the CZS switching metric 390 can also include a CZS special preset threshold 398 that can be switched in response to the preset severity flag being a predetermined value, such as ≥2, thus lowering the threshold for adjusting the stage 2 firing delay in response to a high flagged crash severity level.

From the above description of the invention, those skilled in the art will perceive improvements, changes and modifications. Such improvements, changes, and/or modifications within the skill of the art are intended to be covered by the appended claims.

We claim:

1. A vehicle safety system for helping to protect a vehicle occupant in the event of a frontal collision, comprising:
   a controller;
   one or more crash sensors for sensing a frontal collision; and
   an active sensor for detecting objects in the path of the vehicle;
   wherein the controller is configured to implement crash discrimination metrics that detect the occurrence of a frontal collision in response to signals received from the crash sensors, the crash discrimination metrics implementing thresholds for determining whether the signals received from the crash sensors indicate the occurrence of a frontal collision, and
   wherein the controller is configured to implement an algorithm that uses information obtained from the active sensor to:
      detect an object in the path of the vehicle prior to the frontal collision;
      select the thresholds implemented in the crash discrimination metrics in response to detecting the object in the path of the vehicle; and
      select misuse boxes associated with the selected thresholds implemented by the crash discrimination metrics based on the information obtained from the active sensor.

2. A vehicle safety system for helping to protect a vehicle occupant in the event of a frontal collision, comprising:
   a controller;
   one or more crash sensors for sensing a frontal collision; and
   an active sensor for detecting objects in the path of the vehicle;
   wherein the controller is configured to implement crash discrimination metrics that detect the occurrence of a frontal collision in response to signals received from the crash sensors, the crash discrimination metrics implementing thresholds for determining whether the signals received from the crash sensors indicate the occurrence of a frontal collision,
   wherein the controller is configured to implement an algorithm that uses information obtained from the active sensor to detect an object in the path of the vehicle prior to the frontal collision and to select the thresholds implemented in the crash discrimination metrics in response to detecting the object in the path of the vehicle, and
   wherein the algorithm implemented by the controller is further configured to:
      determine an object type for the object;
      determine an estimated severity of an impact with the object; and
      select the thresholds implemented in the crash discrimination metrics further in response to at least one of the object type and the estimated severity.

3. The vehicle safety system recited in claim 2, wherein the object type comprises one of a car, truck, barrier, and pole.

4. The vehicle safety system recited in claim 2, wherein the algorithm implemented by the controller is configured to determine the estimated severity by implementing a metric that determines the estimated severity based on a relative velocity between the object and the vehicle.

5. The vehicle safety system recited in claim 4, further comprising at least one actuatable safety device comprising an airbag with a two-stage inflator and a seatbelt pretensioner, and
   wherein the algorithm implemented by the controller is configured to determine one of the following actions to take in response to the estimated severity:
      actuate neither the seatbelt pretensioner nor the inflator;
      actuate the seatbelt pretensioner only;
      actuate the seatbelt pretensioner and the inflator first stage;
      actuate the seatbelt pretensioner, inflator first stage, and the inflator second stage.

6. The vehicle safety system recited in claim 4, wherein the algorithm for detecting the object in the path of the vehicle is configured to detect the object by:
   determining whether the object type is a recognized object type;
   determining whether the object lateral position is within a predetermined threshold range;
   determining whether the TTC with the object is within a threshold indicative of an impending collision by evaluating a TTC collision discrimination metric to determine whether the TTC exceeds a predetermined threshold, the threshold being determined with respect to the relative velocity of the object and the vehicle; and
   determining whether the longitudinal position of the object relative to the vehicle is within a threshold indicative of an impending collision by evaluating a longitudinal distance collision discrimination metric to determine whether the longitudinal distance between the object and the vehicle exceeds a predetermined threshold, the threshold being determined with respect to the relative velocity of the object and the vehicle.

7. The vehicle safety system recited in claim 6, wherein the recognized object type comprises a vehicle, truck, barrier, or pole.

8. The vehicle safety system recited in claim 2, wherein the algorithm implemented by the controller is further configured to select misuse boxes associated with the selected thresholds implemented by the crash discrimination metrics in response to at least one of the object type and estimated severity.

9. The vehicle safety system recited in claim 2, wherein the algorithm implemented by the controller is further configured to determine the estimated severity by evaluating an estimated severity discrimination metric that compares a relative velocity of the object relative to the vehicle and displacement.

10. The vehicle safety system recited in claim 2,
wherein the crash sensors comprise front crush zone sensors (CZS); wherein the crash discrimination metrics comprise a CZS switching discrimination metric for evaluating CZS acceleration values to determine whether a CZS switching threshold is exceeded;
wherein the crash discrimination metrics comprise individual metrics associated each object type determined by the algorithm, each individual metric comprising a normal threshold and misuse box, and a CZS switched threshold and misuse box, the CZS switched threshold and misuse box being implemented by the crash discrimination metrics when the CZS switching discrimination metric determines that the CZS switching threshold is exceeded, the normal threshold and misuse box being implemented in the absence of the CZS switching threshold being exceeded; and
wherein the crash discrimination metrics further comprise a normal preset threshold and misuse box, and a CZS switched preset, wherein the CZS switched preset threshold and misuse box are implemented by the crash discrimination metrics when the CZS switching discrimination metric determines that the CZS switching threshold is exceeded and the algorithm detects the object in the path of the vehicle, the normal preset threshold and misuse box being implemented in the absence of the CZS switching threshold being exceeded and the algorithm detects the object in the path of the vehicle.

11. The vehicle safety system recited in claim 1:
wherein the crash sensors comprise front crush zone sensors (CZS);
wherein the crash discrimination metrics comprise a CZS switching discrimination metric for evaluating CZS acceleration values to determine whether a CZS switching threshold is exceeded;
wherein the crash discrimination metrics comprise individual metrics associated each object type determined by the algorithm, each individual metric comprising a normal threshold and misuse box, and a CZS switched threshold and misuse box, the CZS switched threshold and misuse box being implemented by the crash discrimination metrics when the CZS switching discrimination metric determines that the CZS switching threshold is exceeded, the normal threshold and misuse box being implemented in the absence of the CZS switching threshold being exceeded; and
wherein the crash discrimination metrics further comprise a normal preset threshold and misuse box, and a CZS switched preset, wherein the CZS switched preset threshold and misuse box are implemented by the crash discrimination metrics when the CZS switching discrimination metric determines that the CZS switching threshold is exceeded and the algorithm detects the object in the path of the vehicle, the normal preset threshold and misuse box being implemented in the absence of the CZS switching threshold being exceeded and the algorithm detects the object in the path of the vehicle.

12. The vehicle safety system recited in claim 1, wherein the algorithm implemented by the controller is configured to detect objects in the path of the vehicle by:
identifying the object;
determining whether a lateral position of the object with respect to the vehicle is within a predetermined threshold;
evaluating a time-to-collision (TTC) discrimination metric to determine whether a relative velocity between the object and the vehicle exceeds a predetermined threshold dictating that a crash is imminent; and
evaluating a longitudinal distance collision discrimination metric to determine whether the longitudinal position of the object relative to the vehicle exceeds a predetermined threshold dictating that a crash is imminent.

13. The vehicle safety system recited in claim 1, wherein the algorithm implemented by the controller is configured to detect objects in the path of the vehicle by:
identifying a state of the object;
determining whether a calculated crash probability is greater than a predetermined crash probability; and
evaluating a time-to-collision (TTC) discrimination metric to determine whether the relative velocity between the object and the vehicle exceeds a predetermined threshold dictating that a crash is imminent.

14. The vehicle safety system recited in claim 1, wherein the crash sensors are components of a passive safety system further comprising at least one actuatable safety device, the passive safety system being configured to respond to the occurrence of a vehicle collision by actuating the safety device, and wherein the active sensor is a component of an active safety system configured to anticipate the occurrence of the vehicle collision.

15. A vehicle safety system for helping to protect a vehicle occupant in the event of a frontal collision, comprising:
a controller;
one or more crash sensors for sensing a frontal collision; and
an active sensor for detecting objects in the path of the vehicle;
wherein the controller is configured to implement crash discrimination metrics that detect the occurrence of a frontal collision in response to signals received from the crash sensors, the crash discrimination metrics implementing thresholds for determining whether the signals received from the crash sensors indicate the occurrence of a frontal collision,
wherein the controller is configured to implement an algorithm that uses information obtained from the active sensor to detect an object in the path of the vehicle prior to the frontal collision and to select the thresholds implemented in the crash discrimination metrics in response to detecting the object in the path of the vehicle, and
wherein the crash sensors comprise at least one of crush zone sensors and airbag control unit (ACU) sensors in the form of accelerometers for measuring vehicle acceleration along a longitudinal vehicle axis.

16. The vehicle safety system recited in claim 15, wherein the crash discrimination metrics have a value determined by comparing acceleration vs. displacement or velocity vs. displacement, as measured by the crash sensors, and the crash discrimination metrics determine the occurrence of a frontal collision in response to the value exceeding the threshold.

17. The vehicle safety system recited in claim 1, wherein the active sensor comprises a camera, and wherein the information obtained from the active sensor comprises the object type, an object lateral position, a time to collision (TTC) with the object, a relative velocity of the object and the vehicle, and a longitudinal position of the object relative to the vehicle.

18. The vehicle safety system recited in claim 1, wherein the active sensor comprises a radar sensor, and wherein the information obtained from the active sensor comprises an object state, a collision probability, a time to collision (TTC) with the object, and a relative velocity of the object and the vehicle.

19. The vehicle safety system recited in claim 18, wherein the algorithm for detecting the object in the vehicle path is configured to detect the object by:

determining whether the object state is a recognized object state;
determining whether the collision probability is greater than a predetermined threshold probability; and
determining whether the TTC with the object is within a threshold indicative of an impending collision by evaluating a TTC collision discrimination metric to determine whether the TTC exceeds a predetermined threshold, the threshold being determined with respect to the relative velocity of the object and the vehicle.

20. The vehicle safety system recited in claim 19, wherein the recognized object state comprises a forward state, backward state, sideways state, stationary state, or moving state.

21. The vehicle safety system recited in claim 1, wherein the active sensor comprises at least one of a camera, a radar sensor, and a laser radar (LIDAR) sensor.

22. The vehicle safety system recited in claim 1, wherein the controller comprises an airbag controller unit (ACU).

* * * * *